United States Patent [19]
Arney et al.

[11] Patent Number: 5,692,706
[45] Date of Patent: Dec. 2, 1997

[54] INFLATABLE FLOAT STEP-REINFORCEMENT SYSTEM

[76] Inventors: Donald B. Arney, 3659 Bamfield Dr., Richmond, Canada, V6X 3B4; Peter L. Brooke, 6504 Lyon Road, Delta, Canada, V4E 1H7

[21] Appl. No.: 537,488

[22] Filed: Oct. 2, 1995

[51] Int. Cl.⁶ .......................... B64C 01/24; B64C 25/56; B63B 07/08
[52] U.S. Cl. ...................... 244/129.6; 244/100 A; 244/106; 114/292; 114/345
[58] Field of Search ........................ 244/100 A, 105, 244/106, 129.6; 114/345, 292, 291

[56] References Cited

U.S. PATENT DOCUMENTS

| | | | |
|---|---|---|---|
| 2,375,973 | 5/1945 | Cooper et al. | 114/66.5 |
| 2,391,326 | 12/1945 | McKinley | 244/106 |
| 2,507,913 | 5/1950 | Lanser | 244/105 |
| 2,692,099 | 10/1954 | Doolittle | 244/105 |
| 2,718,367 | 9/1955 | Doolittle | 244/105 |
| 4,019,698 | 4/1977 | Earl | 244/100 A |
| 4,697,762 | 10/1987 | Arney | 244/101 |

*Primary Examiner*—Andres Kashnikow
*Assistant Examiner*—Virna Mojica
*Attorney, Agent, or Firm*—Young & Basile, P.C.

[57] ABSTRACT

An improved step reinforcement system is disclosed for use in inflatable or pneumatic aircraft floats such as are employed in waterborne and amphibious aircraft. The float itself comprises a continuous tubular shell having spaced apart upper and lower walls interconnected by spaced apart first and second side walls to define an interior space within the float. The lower wall further includes a step extending continuously and transversely between vertically spaced fore and aft portions thereof. According to the improvement of the present invention, at least one inflatable bladder is disposed within the interior space of the float so as to be adjacent to the step and abut at least the lower wall of the float. The bladder has an internal pressure sufficiently greater than the internal pressure of the float so as to reinforce the step. An elongate stiffening element abuts the fore portion of the lower wall of the float forward from the step. Further disclosed is a method for selectively reducing or increasing the distance required for takeoff of the aircraft, the method comprising the step of selectively increasing or decreasing the internal pressure of the at least one inflatable bladder.

24 Claims, 4 Drawing Sheets

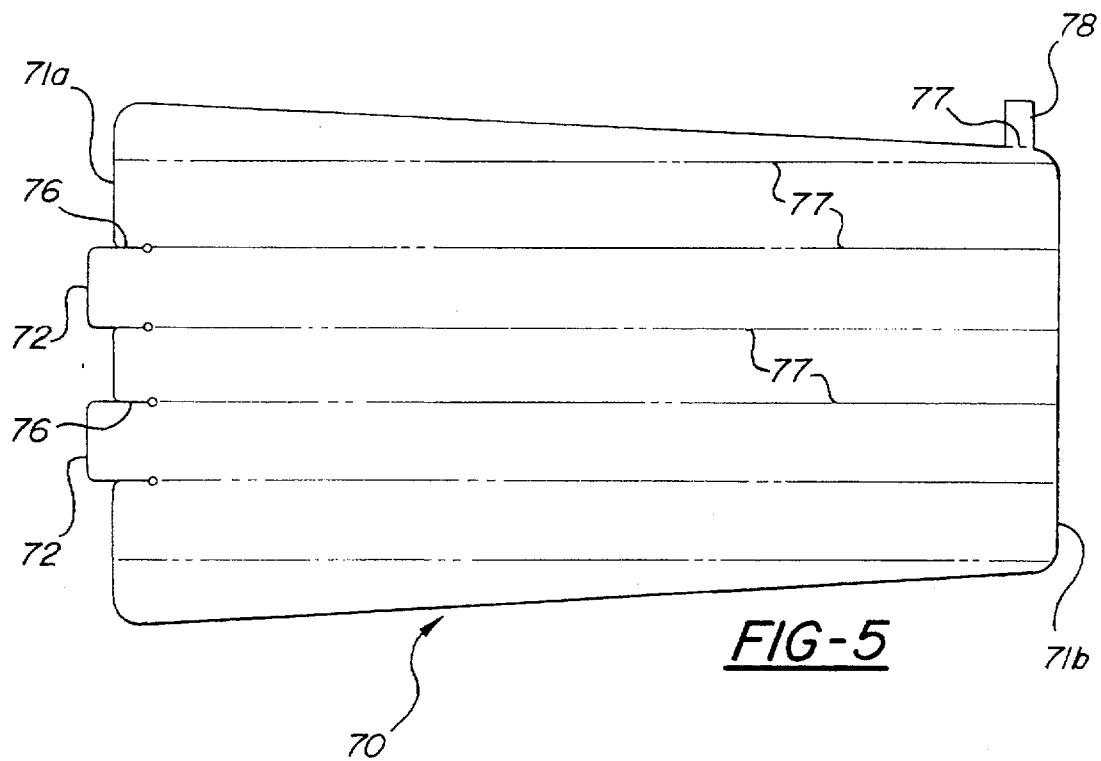
FIG-5
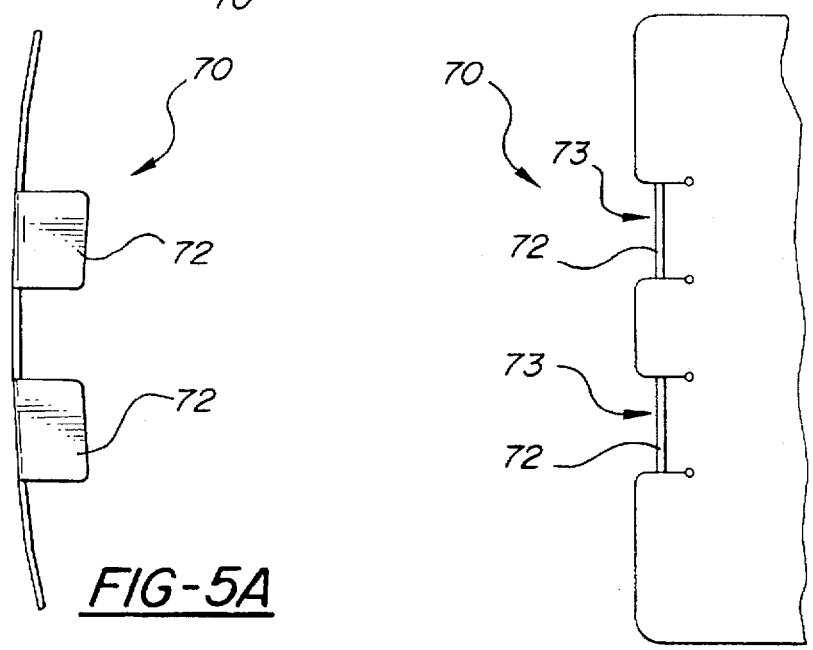
FIG-5A
FIG-5C
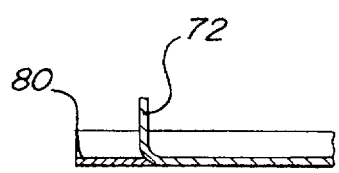
FIG-5B

INFLATABLE FLOAT STEP-REINFORCEMENT SYSTEM

FIELD OF THE INVENTION

The present invention relates generally to inflatable or pneumatic floats for waterborne or amphibious aircraft and more particularly to an improved step reinforcement system for such floats whereby the step is not significantly deformed during takeoff and landing of the aircraft and a method whereby the distance required for takeoff of the aircraft may be selectively increased or decreased.

BACKGROUND OF THE INVENTION

Floats for waterborne or amphibious aircraft are well known and have been the subject of numerous improvements throughout the years. Typically, most types of aircraft floats are characterized by a continuous tubular shell comprising interconnected upper, lower, and side walls. The lower wall of the shell defines the float's planing surface, which assists in planing and rotation of the aircraft during takeoff. The planing surface comprises vertically separated fore and aft portions of the lower wall connected to opposite upper and lower edges of a transversely extending step. The step effectively precludes the aft portion of the float from contacting the water as an aircraft is propelled forward during takeoff, thereby reducing unwanted drag.

Especially with the advent of light and ultralight aircraft, inflatable or pneumatic floats have been taught (such as by Cooper et al., U.S. Pat. No. 2,375,973, and myself, U.S. Pat. No. 4,697,762) as a desirable alternative to more conventional rigid-metal or glass-reinforced plastic floats, both of which tend to be too weight restrictive for very small aircraft. Unfortunately, prior art inflatable floats are plagued by a number of problems.

Conventional inflatable floats are made of tough but non self-supporting material such as nylon, or like material, such that the step is reinforced only by the internal pressure of the float. Consequently, it is a quite common occurrence in aircraft equipped with such floats for the step to be significantly deformed under the forces exerted thereagainst during both takeoff and landing.

One solution to this problem has been to provide a contoured float-board assembly along the lower surface of the float between the fore and aft portions, the float board comprising an angled step between vertically spaced backing and support boards. A gusset extends exteriorly from the lower transverse edge of the step to the rearward, backing board, while a reinforcing plate connects the forward, support board to the upper transverse edge of the step. Ideally, the gusset acts to equally distribute the forces exerted upon the planing surface during takeoff and landing between the support and backing boards, thereby reducing deformation of the step. In practice, however, it has proven difficult to manufacture an inexpensive, lightweight float board assembly which is nevertheless capable of withstanding the forces exerted by aircraft takeoff and landing without significant deformation.

An alternate solution taught in my U.S. Pat. No. 4,697, 762, contemplates cooperative stiffening means provided both within and without the float. According to these means, a rigid sheet member extends along the lower wall of the float forward from the step. The sheet member defines a rigid portion of the float's planing surface, absorbing the forces of takeoff and landing. Relatedly, a plurality of stiff, foam-plastic filler blocks are provided within the float adjacent both the sheet member and the step. These filler blocks reinforce the sheet member, while simultaneously defining a sharp lower transverse edge of the step to improve the planing efficiency thereof.

Apart from the fact that the filler blocks preclude complete deflation of the floats, the above-described step-reinforcement system is further limited in that both the step and the filler blocks may be urged upwards and into the body of the float in response to the forces exerted against the float's planing surface during takeoff and landing.

Yet another problem sometimes encountered by waterborne and amphibious aircraft relates to the distance required for takeoff. It is common in such aircraft to fix the floats so that the longitudinal axes thereof define an acute angular relationship with the aircraft centerline. This angular relationship effects a desired Angle of Attack for the aircraft's wing relative to the horizon, so that the aircraft can maximize its ability to lift off from the water. However, installation of floats on an aircraft requires consideration of a number of variables which are frequently determined by estimating. Consequently, waterborne and amphibious aircraft are frequently fitted with floats the positions of which fail to optimize the aircraft's takeoff capability by providing an incorrect Angle of Attack.

SUMMARY OF THE INVENTION

Accordingly, it is an object of the present invention to provide a step reinforcement system for inflatable or pneumatic aircraft floats which will not cause significant deformation of the step during aircraft takeoff and landing.

A further object of this invention is to simultaneously provide for such a reinforcement system which is both lightweight and relatively inexpensive to manufacture.

Yet another object of the present invention is to provide method for optimizing the takeoff capability of aircraft having imprecisely installed floats.

These and other objects of the present invention are accomplished according to a step reinforcement system for use in conjunction with inflatable or pneumatic floats such as are employed in waterborne or amphibious aircraft. The float comprises a tubular shell with spaced apart upper and lower walls interconnected by spaced apart first and second side walls to define an interior space within the float. The lower wall further includes a step extending continuously and transversely between vertically spaced forward and aft portions of the lower wall. The step reinforcement system includes at least one inflatable bladder disposed within the interior of the float adjacent the step and abutting at least the lower wall of the float. The bladder has an internal pressure sufficiently greater than the internal pressure of the rest of the float in order to reinforce the step against the force imposed thereon during takeoff and landing. An elongate stiffening member abuts the fore portion of the lower wall forward from the step, the stiffening member providing a rigid area of the float's planing surface for absorbing the forces of takeoff and landing. The stiffening member may further include at least a first tab extending transversely upwards from the rearward transverse edge thereof. According to this feature, the tab helps to prevent both the rearward edge of the stiffening member from inadvertently sliding forward of the step, as well as rearward bulging of the step as a result of pressure exerted by the bladder as it is compressed slightly during landing.

According to one feature of the invention, the step-reinforcement system of this invention may include two such bladders, with each bladder having a preferred internal pressure of between approximately 5 and 10 times the internal pressure of the rest of the float. According to one embodiment of this inventive step-reinforcement system, the internal pressure of the bladder is 15 p.s.i., while the internal pressure of the inflatable or pneumatic float is between approximately 1.5 p.s.i. and 3.0 p.s.i.

According to another feature of this inventive step reinforcement system, a reinforcement member is provided on the upper wall of the float adjacent the bladder. This reinforcement system helps ensure correct positioning of the bladder, in addition to strengthening the upper wall against pressure exerted by the bladder thereon during aircraft takeoff and landing. To this end, the reinforcement member and the float shell each include at least a first bore therethrough, the bore being coaxially aligned to receive valve means protruding from the bladder, the valve means providing for the selective inflation or deflation of the bladder. The bladder, shell, and reinforcement member are sealingly engaged by sealing means to prevent unwanted leakage either into or out of the float. The reinforcement member further includes vertically oriented side walls extending upward from opposing transverse edges thereof, the side walls extending perpendicular with respect to the longitudinal axis of the float. In an inflatable or pneumatic float of the type in which the present invention is easily incorporated, these side walls are disposed between parallel extending stiffening tubes running longitudinally along the upper wall of the float.

According to yet a further feature of the present invention, a method is provided whereby the internal pressure of the at least one inflatable bladder is selectively increased or decreased to effect a corresponding change in the aircraft's Angle of Attack relative to a horizontal surface (i.e., the water), thereby enabling a reduction in the distance required for takeoff of the aircraft.

BRIEF DESCRIPTION OF THE DRAWINGS

FIG. 5 is a top view of the stiffening element of the present invention;

FIG. 5A is an end view of the stiffening element of FIG. 5;

FIG. 5B is a lateral cross-section of the tab of the stiffening element of FIG. 5;

FIG. 5C is a top view of the first end of the stiffening element of FIG. 5;

DESCRIPTION OF THE ILLUSTRATED EMBODIMENT

Figure 1:
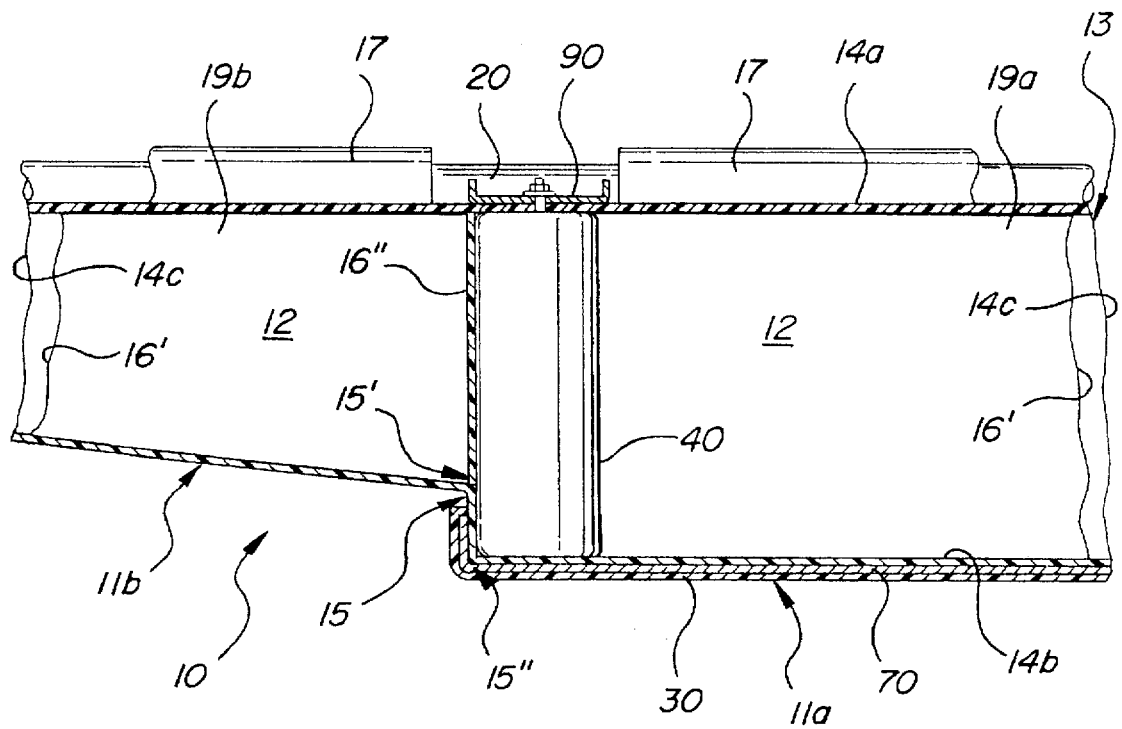
FIG. 1 is a cross-sectional view of the step of a typical inflatable or pneumatic aircraft float, incorporating the step reinforcement system of the present invention.

Referring now to the drawings, an inflatable or pneumatic float-assembly for waterborne or amphibious aircraft having a step reinforcement system is disclosed whereby significant deformation of the step is reduced during aircraft takeoff and landing. While not depicted, two such identical float assemblies are typically provided on each aircraft, the floats fixed to the aircraft via struts and extending parallel to each other as well as the aircraft's longitudinal axis, or centerline. Though suitable for use in inflatable or pneumatic floats affixed to any type of aircraft, the present invention is especially useful in smaller conventional fixed-wing aircraft having a gross weight of 1,000 lbs. or more, as well as personal aircraft such as ultralights. It will further be appreciated from the following disclosure that the present inventive step reinforcement system is particularly useful in conjunction with fixed-wing aircraft of the variety having a conventional tractor-type propeller arrangement.

Figure 2:
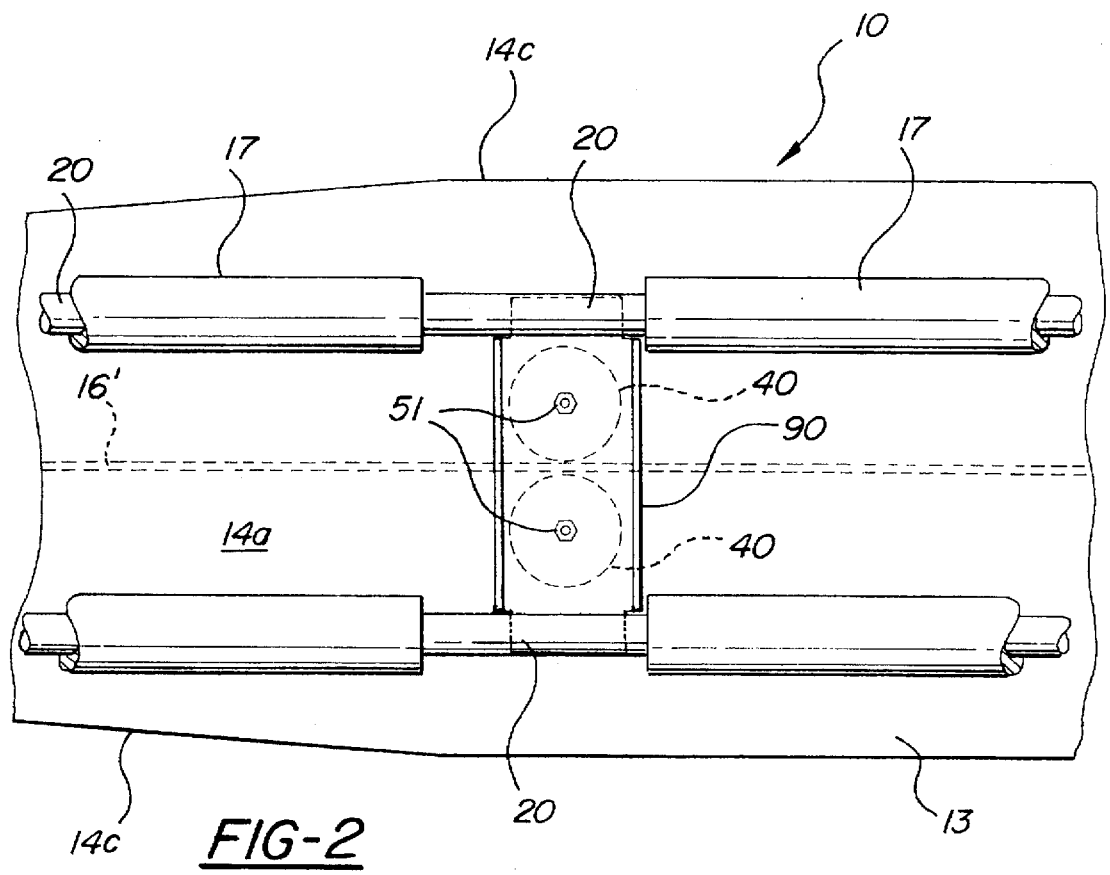
FIG. 2 is a top view of the aircraft float of FIG. 1.

Referring now to FIGS. 1 and 2, the float step reinforcement system of this invention generally comprises an elongate stiffening element 70, a reinforcement member 90, and at least one inflatable bladder 40. Each of the foregoing constituent elements is incorporated into an inflatable or pneumatic float 10 such as of the type having a structure similar to that disclosed in my previous U.S. Pat. No. 4,697,762, which float 10 comprises a tubular float shell 13 having spaced apart upper 14a and lower 14b walls interconnected by spaced apart first and second side walls 14c to define an interior space 12. Preferably, float shell 13 is constructed of tough, non self-supporting fabric such as coated nylon; upper 14a, lower 14b, and side walls 14c being interconnected by sewing according to known techniques. Coated nylon is well suited to the present invention as it is resistant to degradation by ultraviolet radiation. As shown, lower wall 14b of float 10, which defines the float's planing surface, is characterized by a step 15 having an acute angular cross-section and defining fore 11a and aft 11b portions of the lower wall. Each fore 11a and aft 11b portion is further adjacent opposite transverse edges 15" and 15', respectively, of step 15, thereby defining a continuous lower wall 14b. A removeable polymeric hull cap 30 is complimentary to and covers the exterior area of fore portion 11a of lower wall 14b, providing a wear surface therefor. Interiorly, float 10 is subdivided by a plurality of longitudinally extending, parallel bulkheads 16' to define a number of discrete longitudinal compartments. A transversely extending bulkhead 16" further bisects these longitudinal compartments between upper wall 14a and upper transverse edge 15' of step 15 so as to define a plurality of interior compartments (of which 19a and 19b are exemplary). Each such interior compartment accommodates at least one comparably shaped gas-inflatable or pneumatic bladder (not shown) for purposes of inflating float 10 and providing for the buoyancy thereof. At least one such compartment further includes a bladder 40, as explained hereinbelow, for reinforcing step 15. Transverse bulkhead 16" also serves to more sharply define step 15 between upper transverse edge 15' and adjacent aft portion 11b of lower wall 14b, by ensuring that upper transverse edge 15' of step 15 is not urged excessively outward from float 10 in response to compression of the float.

As described in my prior U.S. Pat. No. 4,697,762, torsional and longitudinal rigidity for each float 10 is provided for by a pair of parallel, longitudinally extending stiffener tubes 20, which tubes are threaded within a discontinuous sleeve 17 provided along the exterior of upper wall 14a. Each stiffener tube 20 further provides means for cooperating with an aircraft's struts, so that a pair of floats 10 may be affixed thereto.

Figure 3A:
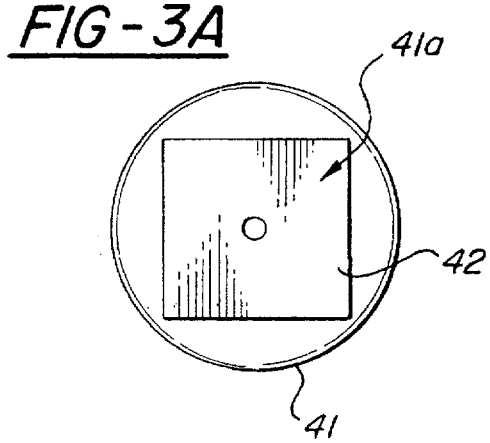
FIG. 3A is a top view of the bladder of FIG. 3.
Figure 3B:
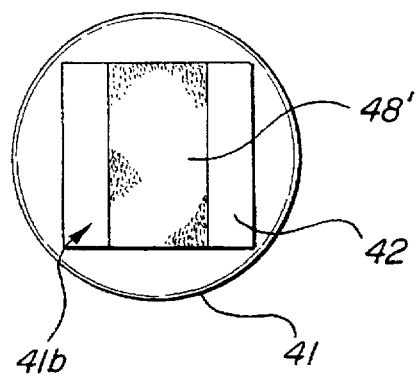
FIG. 3B is a bottom view of the bladder of FIG. 3.
Figure 3:
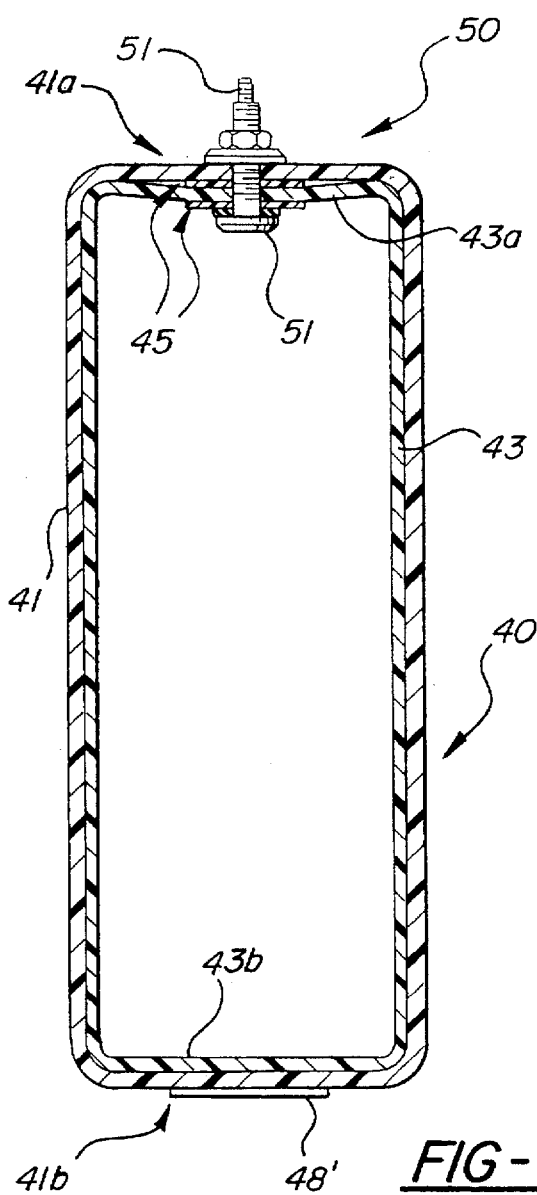
FIG. 3 is a lateral cross-section of the bladder of the present invention shown in an inflated condition.

Turning now to FIG. 3, each gas inflatable bladder 40 comprises an outer shell 41 having first 41a and second 41b ends, the outer shell surrounding an equivalently sized inner shell 43 having first 43a and second 43b ends. Valve means 50 extend from first end 43a of inner shell 43 and through first end 41a of outer shell 41, the valve means comprising a long-stem valve 51 for both selectively inflating and deflating bladder 40 and for detachably connecting bladder 40 to float 10 and reinforcement member 90, as explained further hereinbelow. In the inflated condition, bladder 40 defines a substantially cylindrical form. Outer shell 41 is ideally fabricated from tough, resilient material capable of withstanding repeated deformation of bladder 40 occurring during aircraft takeoff and landing. One preferred material is Cordura® nylon, with an average material thickness of around 10 mil. being preferable for use in this invention. Inner shell 43 is ideally impermeable to gas so that it may be inflated. As with outer shell 41, it is similarly preferred that inner shell 43 be fatigue resistant and elastic, so that it too can withstand repeated deformation. One preferred material having these characteristics is urethane, which material further includes the property of being somewhat adhesive. This adhesive quality of urethane is desirable as it ensures, upon inflation of bladder 40, a secure engagement between inner shell 43 and outer shell 41, such that the two shells do not move relative to each other during operation of the present invention. First 41a and second 41b ends of outer shell 41 each comprise separate panels 42 of nylon, such as Cordura®, each panel 42 having a thickness approximately twice that of the rest of outer shell 41 and being sewn or otherwise secured to the rest of outer shell 41. (FIGS. 3, 3A and 3B.) Panels 42 are further coated according to known methods to provide the ends 41a, 41b of bladder 40 with increased strength. First 43a and second 43b ends of inner shell 43 also comprise separate panels 44, each panel made of the preferred urethane material and being annealed at high temperature to the rest of inner shell 43 according to known techniques to ensure that the inflatable inner shell 43 is leakproof. First end 43a of inner shell 43 further includes strengthening patch means 45 surrounding long-stem valve 51, the patch means 45 serving to prevent tearing or puncturing of first end 43a as a result of pivotal movement of the valve. Patch means 45 comprises two circular discs of reinforced urethane or like material arranged coaxial with valve means 50 on opposing surfaces of panel 44 at first end 43a, each disc preferably having a thickness of around 10 mil. so that the thickness of inner shell 43 at first end 43a surrounding the longitudinal axis of bladder 40 is approximately 30 mil. A further reinforcing patch 47 comprising a disc-shaped piece of urethane-coated nylon is provided between patch means 45 and outer shell 41. Reinforcing patch 47 prevents leakage of inner shell 43 caused when the urethane material of the inner shell is compressed between long-stem valve 51 and sealing means 60.

The size of each bladder 40 in relation to float 10 is at least such as to provide sufficient positive pressure relative to the area of step region 15 to resist the significant deformation thereof during aircraft takeoff and landing, while simultaneously avoiding undesired bulging of float 10. Accordingly, it is preferred that each bladder fit snugly within a space defined by transverse 16" and a longitudinal bulkheads 16' and upper 14a and lower 14b walls of float 10. In the illustrated form, bladder 40 has an inflated height of approximately 16 inches and an inflated diameter of around 7 inches, these dimensions being well-suited to use in floats having a length of around 16 feet, nine inches (16' 9"), a beam of approximately thirty three inches (33"), and an overall displacement of approximately 2150 lbs. Of course, it will be understood that the above-disclosed dimensions for the illustrated embodiment are subject to variation according to the size of the float in conjunction with which the present invention is incorporated.

Figure 4:
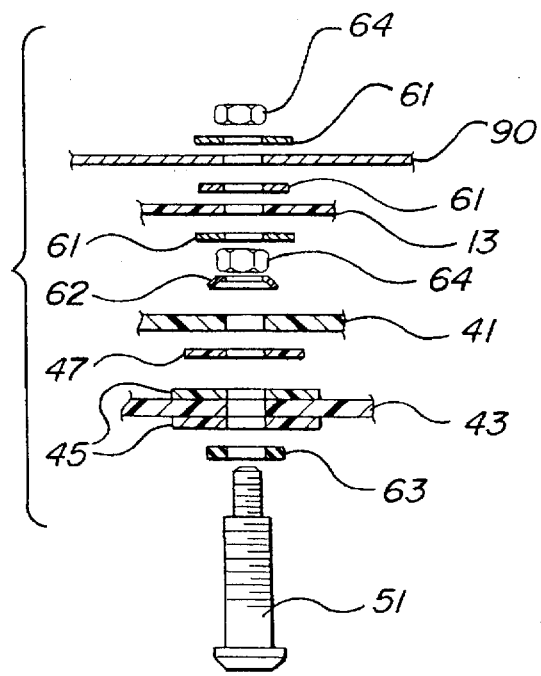
FIG. 4 is an exploded detail view of the valve means provided on the bladder of the present invention.

As shown in FIG. 4, long-stem valve 51 is disposed on first end 43a of inner shell 43 so as to protrude through coaxial bores in each of outer shell 41, float shell 13, and reinforcement member 90, thereby permitting bladder 40 to be easily inflated or deflated as desired from the exterior of each float 10. Seal means comprising a plurality of metal 61, brass 62, and rubber 63 washers, as well as brass nuts 66 are seated coaxially on long-stem valve 51 and interspersed between first end 43a of inner shell 43, float shell 13 of float 10, and reinforcement layer 70, in order to insure a proper leak-proof sealing engagement between valve means 50 and bladder 40.

Referring again to FIG. 3B, fastening means 48' are fixedly disposed to panel 42 at second end 41b of bladder 40. These means 48' comprise a portion of hook-and-loop material, such as Velcro®. Complimentary fastening means (not shown) are fixedly disposed on the interior surface of lower wall 14b of float 10 adjacent step 15, such that second end 41b may be detachably secured thereto for reasons set forth more fully hereinbelow.

Turning now to FIGS. 5, 5A, and 5B, stiffening element 70 comprises an elongate, trapezoidal sheet of rigid material having first 71a and second 71b ends and being characterized by an upwardly curved, bilaterally symmetrical form corresponding generally to the shape of both fore portion 11a of lower wall 14b, as well as hull cap 30. To reduce manufacturing expense, stiffening element 70 is preferably formed as a two-dimensional blank from steel, aluminum, or like metal according to known methods. To achieve the preferred three-dimensional, bilaterally symmetrical form, stiffening element 70 is subsequently bent along a plurality of equidistant longitudinal scores 77, each score forming the vertex for a three degree angular bend. In the illustrated form, metal such as aluminum is employed, as it permits stiffening element 70 to be formed according to known stamping techniques and subsequently bent by hand or with the use of light machinery. To additionally facilitate the described bending process, stiffening element 70 includes flange 78 depending therefrom, flange 78 providing means for aligning second end 71b of stiffening element 70 with a brake or similar bending implement. Upon bending, flange 78 is simply broken off, and may be transversely scored 79 for that purpose.

Alternatively, stiffening element 70 may be formed from fiberglass in the above-described three-dimensional shape according to known molding techniques. According to this method of construction, flange 78 is unnecessary, and stiffening element 70 may be formed without it.

First end 71a of stiffening element 70 includes first and second medially disposed tabs 72 protruding therefrom, a portion of the lateral edges 76 of which extend inward from first end 71a towards the stiffening element. After the blank of stiffening element 70 is formed, tabs 72 are bent vertically upwards. (FIG. 5B). As depicted, tabs 72 in the bent condition are interior of first end 71a, leaving a pair of open notches 73 formerly occupied by tabs 72. (FIG. 5C.) In the preferred embodiment, rigid plates 80 complimentary in size and shape to each notch 73 are affixed therein by welding or other appropriate method.

Figures 6, 6A:
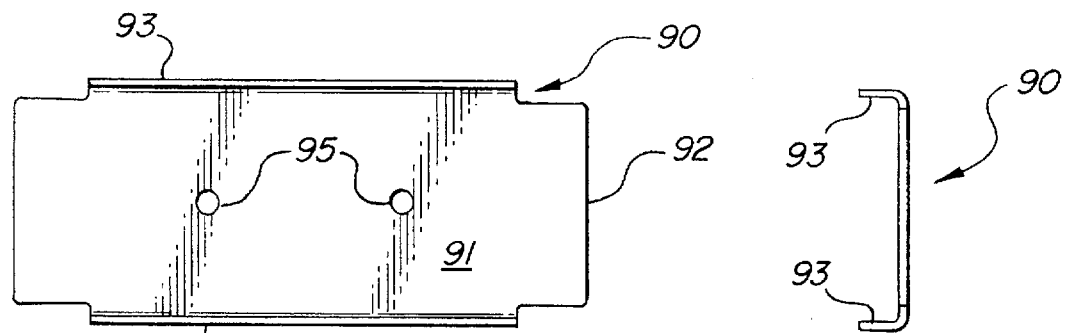
FIG. 6 is a top view of the reinforcing plate of the present invention, shown in a bent condition.
FIG. 6A is an end view of the reinforcing plate of FIG. 6.
Figure 6B:
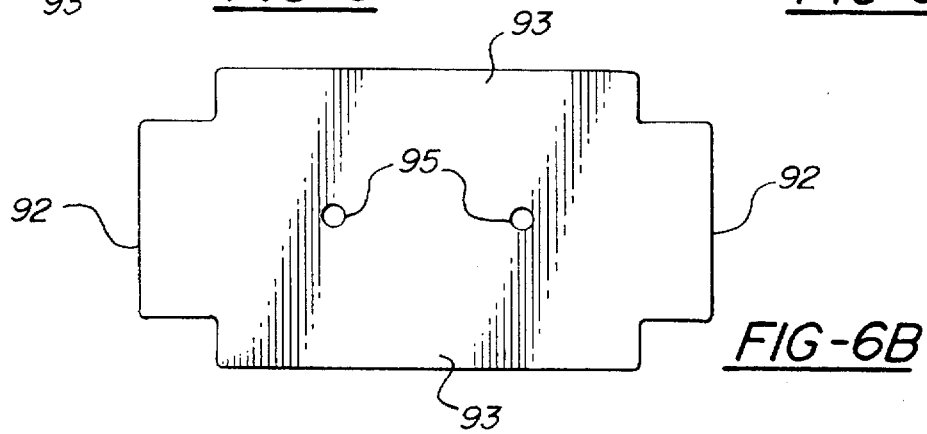
FIG. 6B is a flat view of the reinforcing plate of FIG. 6.

Turning now to FIGS. 6, 6A, and 6B, reinforcing member 90 comprises a generally rectangular sheet of rigid material including a medial surface 91 having first and second opposing ends 92 and first and second parallel, opposing side walls 93 bent perpendicularly upward with respect to medial surface 91. It will be appreciated that side walls 93 increase the torsional rigidity of reinforcing member 90 in a first direction. Spaced apart bores 95 are disposed along the longitudinal axis of medial surface 91, each bore 95 receiving a long-stem valve 51 therethrough. Like stiffening element 70, reinforcement member 90 is manufactured in blank from metal or like material, the blank being subsequently bent to achieve the preferred three-dimensional shape. As with stiffening element 70, reinforcement member 90 may alternately be formed in its preferred three-dimensional form from fiberglass according to known methods.

Referring again to FIGS. 1 and 2, the arrangement and operation of the various constituent elements of the present inventive step reinforcement system will be better understood. Sandwiched between fore portion 11a of lower wall 14b and hull cap 30 is stiffening element 70, which extends forward from the lower transverse edge 15" of step 15 to the approximate middle of fore portion 11a (not shown). Tabs 75 confront step 15, preventing both unwanted forward movement of stiffening element 70 or rearward bulging of step 15 as a result of pressure exerted by bladder 40 as it is compressed slightly during landing.

Within interior 12 of float 10, at least one bladder 40 is disposed within one longitudinal compartment 12a immediately forward of transverse bulkhead 16". For reasons explained in greater detail below, the present invention preferably includes two such bladders 40 (shown in dashed lines in FIG. 2) oriented along the same transverse plane and separated by a medial longitudinal bulkhead 16' (also indicated by dashed lines). Each bladder 40 is preferrably oriented within float 10 so as to contact opposing upper 14a and lower 14b walls. Reinforcing member 90 is provided on the exterior surface of upper wall 14a adjacent and opposing first end 42a of outer shell 41 of bladder 40. Reinforcing member 90 is perpendicular to the longitudinal axis of float 10, such that opposing sides 93 each abut stiffener tubes 20 at right angles to prevent the unwanted lateral movement of the reinforcing member. At second end 42b, bladder 40 is fastened to the interior surface of lower wall 14b by complimentary fastening means (including 48') as described. Correspondingly, long-stem valve 51 protrudes from first end 42a of bladder 40 and through both shell 13 and reinforcing member 90, such that each bladder 40 is fixedly retained at its first end 42a by valve means 50 and the seal means as herein described. To ensure that bladder 40 does not move undesiredly during the jarring moments of takeoff and landing, the bladder is detachably fixed in position as described above. This detachable arrangement also permits bladder 40 to be removed as desired for replacement or repair. And when floats 10 are deflated for transportation, storage, or repair, bladders 40 may be similarly deflated through the use of long-stem valve 51.

In operation, the preferred internal pressure of each bladder 40 is sufficiently greater than the internal pressure of float 10 such that each bladder 40 reinforces step 15 against the force exerted upon stiffening element 70 (and hull cap 30) during takeoff and landing. For applications involving aircraft floats similar in dimensions to that of the illustrated embodiment and incorporating two bladders 40, it has been found in practice that an internal pressure for each bladder 40 between 5 and 10 times the internal pressure of float 10 is preferable for preventing significant deformation of step 15, while not causing bladder 40 to exert any appreciable outward force against the float shell 13. Conversely, this preferred relationship between the internal pressure of bladder 40 and the internal pressure of float 10 further enables each bladder 40 to compress slightly under the force of landing. In a float of the dimensions described in the illustrated embodiment, an inflated pressure of between 1.5 p.s.i. and 3.0 p.s.i. is typically preferred as providing a substantially rigid float. Accordingly, an internal pressure for each bladder 40 of 15 p.s.i. is ideally suited to such an application. Of course, it will be understood by those of ordinary skill in the art that the relationship between the inflated pressure of float 10 and the inflated pressure of each bladder 40 is subject to variation depending upon a number of considerations, including the sizes and relative internal areas of both float 10 and bladders 40 and the strength of the material from which both float 10 and bladders 40 are constructed, each of which may be altered according to user preference and the application in which the present inventive step-reinforcement system is applied.

For example, an embodiment of the present inventive step reinforcement system is also contemplated for use in much larger inflatable or pneumatic aircraft floats, such as those having a displacement of around 150,000 lbs. In such an application, it has been determined that where the relative sizes of the preferred two step-reinforcement bladders and the float are consistent with the relative sizes disclosed herein for the illustrated embodiment, an internal pressure for each step-reinforcement bladder sufficient to counter the force exerted upon the aircraft step during takeoff and landing is approximately 27 p.s.i. In contrast, it has been determined that the preferred internal pressure of an inflatable float of such size (i.e. 150,000 lbs. displacement) is around ⅓ p.s.i. Accordingly, the preferred internal pressure of the step-reinforcement bladder is approximately 81 times the internal pressure of the float.

A selective increase or decrease in the internal pressure of bladders 40 effected through valve means 50 may also be employed to reduce the distance required for takeoff in certain types of waterborne and amphibious aircraft, specifically those aircraft which do not require a relatively high Angle of Attack in order to generate lift sufficient for takeoff.

Figure 7A:
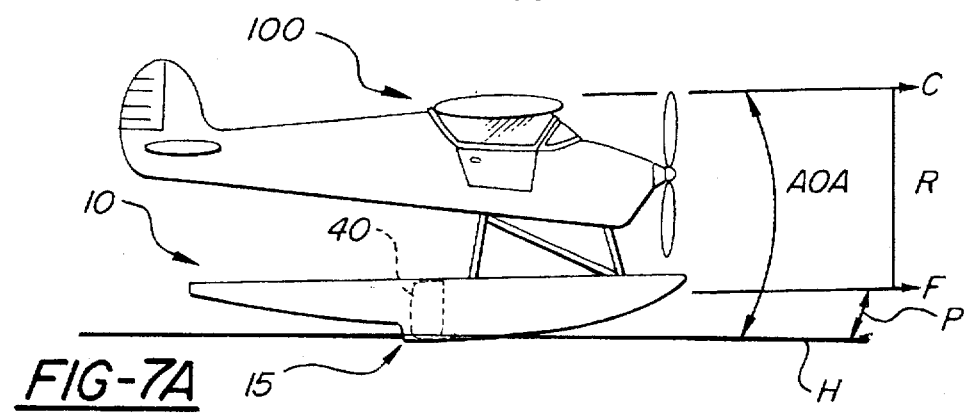
FIGS. 7a and 7b show an aircraft with incorporating the bladder of the present invention.
Figure 7B:
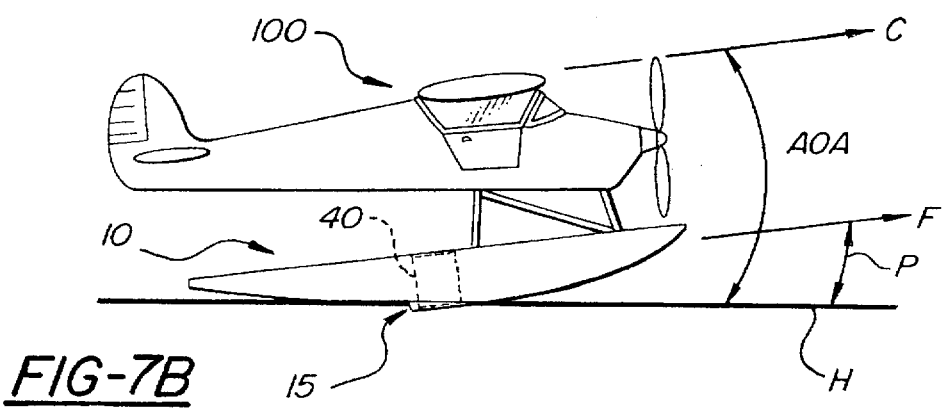

Referring now to FIG. 7A, an aircraft 100 is shown having floats 10 imprecisely aligned such that the longitudinal axis F of each float 10 is parallel to the chord line C of the aircraft wing. Accordingly, the angle between chord line C and the horizontal plane of the water H (referred to as the aircraft's Angle of Attack) is less than optimal when float 10 is planing upon the water. As a consequence, the distance required for aircraft 100 to take off is increased. By deflating bladders 40 (shown in dashed lines) below the preferred 15 p.s.i., a corresponding increase in the angle P between longitudinal axis F and the plane of the water H is effected. This increase in angle P simultaneously effects an increase in the Angle of Attack AOA. (FIG. 7B).

Conversely, it will be apparent that increasing the internal pressure of bladders 40 beyond the preferred 15 p.s.i. will effect a decrease in the Angle of Attack of aircraft 100. (Not shown.) It will be appreciated that this fine tuning of the aircraft's Angle of Attack relative to the surface of the water will enable pilots and aircraft owners to quickly and inexpensively optimize their aircraft's takeoff capability where the aircraft's floats have been installed to define a less than optimal Angle of Attack. This fine tuning permitted by selectively varying the internal pressure of bladder 40 is most ideally suited to aircraft not requiring a high Angle of Attack in order to generate sufficient lift for takeoff, such as the Cessna® 172 series aircraft, since the incremental adjustment in Angle of Attack effected by varying the internal pressure of bladder 40 is only a few degrees in either direction. Similarly, it will be appreciated that deflating bladder 40 will, in particular, result in an increase in the deformation of step 15 during both takeoff and landing. Accordingly, optimizing any aircraft's takeoff capability according to the selective deflation of bladder 40 will have to be balanced against any adverse effects in the nature of increased deformation of step 15.

Of course, it is understood that the foregoing is merely descriptive of the illustrated embodiment of the present invention. Numerous additions and modifications to this embodiment, apparent to those of ordinary skill in the art, are certainly possible without departing from the spirit and broader aspects of the present invention, as set forth in the appended claims.

The invention in which an exclusive property or privilege is claimed is defined as follows:

1. In an inflatable or pneumatic float assembly for waterborne or amphibious aircraft, said float having a continuous tubular shell comprising spaced apart upper and lower walls interconnected by spaced apart first and second side walls to define an interior space within said float, said lower wall further including a step extending continuously and transversely between vertically spaced fore and aft portions of said lower wall, an improved step reinforcement system comprising:
    at least one inflatable bladder disposed within said interior space of said float adjacent said step and abutting at least said lower wall, said bladder having an internal pressure sufficiently greater than the internal pressure of said float so as to reinforce said step; and
    an elongate stiffening element abutting said fore portion of said lower wall forward from said step.

2. The step reinforcement system of claim 1, wherein said stiffening element includes at least a first tab extending transversely upwards therefrom, said tab disposed rearward of said step.

3. The step reinforcement system of claim 1, said bladder further abutting said upper wall, and said step-reinforcement system further including a reinforcement member provided on the opposite side of said upper wall adjacent said bladder.

4. The step reinforcement system of claim 2, wherein said reinforcement member includes opposing, vertically oriented side walls, said side walls extending perpendicular with respect to the longitudinal axis of said float.

5. The step reinforcement system of claim 1, including two of said bladders oriented along the same transverse plane with respect to the longitudinal axis of said float.

6. The step reinforcement system of claim 5, wherein said internal pressure of said bladders is between approximately 5 and 10 times greater than the internal pressure of said float.

7. The step reinforcement system of claim 6, wherein said internal pressure of said bladders is approximately 15 p.s.i.

8. The step reinforcement system of claim 7, wherein further the internal pressure of said inflatable or pneumatic float is between approximately 1.5 p.s.i. and 3.0 p.s.i.

9. The step reinforcement system of claim 3, said bladder including valve means for selectively adjusting the internal pressure thereof, and said upper wall and said reinforcement member each including at least a first bore therethrough, said bores coaxially aligned for receiving said valve means, said valve means being sealingly engaged with said bores by sealing means.

10. In an inflatable or pneumatic float assembly for waterborne or amphibious aircraft, said float having a continuous tubular shell comprising spaced apart upper and lower walls interconnected by spaced apart first and second side walls to define an interior space within said float, said lower wall further including a step extending continuously and transversely between vertically spaced fore and aft portions of said lower wall, and at least one inflatable bladder disposed within said interior space of said float adjacent said step, the method of selectively reducing or increasing the distance required for takeoff of the aircraft, comprising the step of selectively increasing or decreasing the internal pressure of said at least one inflatable bladder.

11. In an inflatable or pneumatic float assembly for waterborne or amphibious aircraft, said float having a continuous tubular shell comprising spaced apart upper and lower walls interconnected by spaced apart first and second side walls to define an interior space within said float, said lower wall further including a step extending continuously and transversely between vertically spaced fore and aft portions of said lower wall, an improved step reinforcement system comprising:
    at least one inflatable bladder disposed within said interior space of said float adjacent said step and abutting at least said upper and lower walls, said bladder having an internal pressure sufficiently greater than the internal pressure of said float so as to reinforce said step;
    means for removably securing said at least one bladder to both said upper and lower walls of said tubular shell; and
    an elongate stiffening element abutting said fore portion of said lower wall forward from said step.

12. The step reinforcement system of claim 11, said at least one bladder including valve means for selectively adjusting the internal pressure thereof, and wherein said means for removably securing said bladder to both said upper and lower walls comprises a reinforcing member provided on the opposite side of said upper wall adjacent said bladder, said reinforcing member receiving said valve means therethrough, and fastening means provided on adjacent regions of said bladder and said lower wall.

13. The step reinforcement system of claim 12, wherein said reinforcement member includes vertically oriented side walls extending upwards therefrom, said side walls extending perpendicular with respect to the longitudinal axis of said float.

14. The step reinforcement system of claim 11, wherein said stiffening element includes at least a first tab extending transversely upwards therefrom, said tab disposed rearward of said step.

15. The step reinforcement system of claim 11, including two of said bladders.

16. The step reinforcement system of claim 15, wherein said internal pressure of said bladders is between approximately 5 and 10 times greater than the internal pressure of said float.

17. The step reinforcement system of claim 16, wherein said internal pressure of said bladder is approximately 15 p.s.i.

18. The step reinforcement system of claim 17, wherein further the internal pressure of said inflatable or pneumatic float is between approximately 1.5 p.s.i. and 3.0 p.s.i.

19. In an inflatable or pneumatic float assembly for waterborne or amphibious aircraft, said float having a continuous tubular shell comprising spaced apart upper and lower walls interconnected by spaced apart first and second side walls to define an interior space within said float, said lower wall further including a step extending continuously and transversely between vertically spaced fore and aft portions of said lower wall, an improved step reinforcement system comprising:
    at least one inflatable bladder disposed within said interior space of said float adjacent said step and abutting at least said upper and lower walls, said bladder including valve means and having an internal pressure sufficiently greater than the internal pressure of said float so as to reinforce said step;

means for removably securing said at least one bladder to both said upper and lower walls of said tubular shell, said means comprising a reinforcing member provided on the opposite side of said upper wall adjacent said bladder, said reinforcing member receiving said valve means therethrough, and fastening means provided on adjacent regions of said bladder and said lower wall; and an elongate stiffening element abutting said fore portion of said lower wall forward from said step.

20. The step reinforcement system of claim 19, wherein said stiffening element includes at least a first tab extending transversely upwards therefrom, said tab disposed rearward of said step.

21. The step reinforcement system of claim 19, including two of said bladders.

22. The step reinforcement system of claim 21, wherein said internal pressure of said bladders is between approximately 5 and 10 times greater than the internal pressure of said float.

23. The step reinforcement system of claim 22, wherein said internal pressure of said bladder is approximately 15 p.s.i.

24. The step reinforcement system of claim 23, wherein further the internal pressure of said inflatable or pneumatic float is between approximately 1.5 p.s.i. and 3.0 p.s.i.

* * * * *